United States Patent [19]
Carter

[11] Patent Number: 5,816,318
[45] Date of Patent: Oct. 6, 1998

[54] COMBINATION DIRECT AND INDIRECT CLOSED CIRCUIT EVAPORATIVE HEAT EXCHANGER

[75] Inventor: Thomas P. Carter, Olney, Md.

[73] Assignee: Baltimore Aircoil Company, Inc., Jessup, Md.

[21] Appl. No.: 389,218

[22] Filed: Feb. 15, 1995

Related U.S. Application Data

[63] Continuation of Ser. No. 78,629, Jun. 16, 1993, Pat. No. 5,435,382.

[51] Int. Cl.$^6$ .................................................. B01F 3/04
[52] U.S. Cl. .................... 165/110; 165/117; 165/900; 62/305; 62/310; 261/152; 261/153
[58] Field of Search ..................... 165/110, 117, 165/900; 62/305, 310; 261/152, 153

[56] References Cited

U.S. PATENT DOCUMENTS

| | | | |
|---|---|---|---|
| 2,247,514 | 7/1941 | Mart ........................................... | 62/305 |
| 2,890,864 | 6/1959 | Stutz .......................................... | 62/310 |
| 3,012,416 | 12/1961 | Dart ........................................... | 62/305 |
| 3,141,308 | 7/1964 | Dart ........................................... | 62/305 |
| 3,148,516 | 9/1964 | Kals ........................................... | 62/305 |
| 3,747,362 | 7/1973 | Mercer ........................................ | 62/171 |
| 3,820,353 | 6/1974 | Shiraishi et al. ............................. | 62/305 |
| 3,865,911 | 2/1975 | Lefevre ....................................... | 261/140 |
| 4,112,027 | 9/1978 | Cates .......................................... | 261/111 |
| 4,119,140 | 10/1978 | Cates .......................................... | 165/67 |
| 4,252,752 | 2/1981 | Flandroy ...................................... | 261/153 |
| 4,315,873 | 2/1982 | Smith .......................................... | 261/158 |
| 4,476,065 | 10/1984 | McKey ........................................ | 261/23 R |
| 4,683,101 | 7/1987 | Cates .......................................... | 261/146 |
| 4,893,669 | 1/1990 | Kashiwada et al. ........................ | 165/38 |
| 4,974,422 | 12/1990 | Kocher ........................................ | 62/305 |
| 5,435,382 | 7/1995 | Carter ......................................... | 165/900 |

FOREIGN PATENT DOCUMENTS

| | | | |
|---|---|---|---|
| 712874 | 7/1965 | Canada ........................................ | 62/310 |
| 1038636 | 9/1978 | Canada ........................................ | 62/310 |
| 1149729 | 7/1983 | Canada . | |
| 0057801 | 8/1982 | European Pat. Off. . | |
| 5223749 | 2/1977 | Japan . | |
| 5340769 | 10/1978 | Japan . | |
| 0154985 | 6/1990 | Japan ........................................ | 165/900 |
| 5-25161 | 4/1993 | Japan . | |

OTHER PUBLICATIONS

Niagara Blower Company, Sales Brochure Entitled "Wet–Surface Air Coolers" p. 41 ASHRAE Journal, Aug. 1979.
IMECO Incorporated Sales, Brochure Entitled "PF Evaporative Condensers"; no other information known (no date).
Rescorcon Incorporated, Sales Brochure Entitled "Wet Surface Air Coolers"; no other information known (no date).

*Primary Examiner*—John K. Ford
*Attorney, Agent, or Firm*—Edward J. Brosius; F. S. Gregorczyk; Stephen J. Manich

[57] ABSTRACT

A heat exchange apparatus is provided with an indirect evaporative heat exchange section and a direct evaporative heat exchange section. A uniform temperature evaporative liquid is downwardly sprayed into the indirect section to indirectly exchange sensible heat with a hot fluid stream flowing within a series of enclosed circuits which comprise the indirect evaporative heat exchange section. After the evaporative fluid descends through the entire indirect heat exchange section and absorbs heat, it is distributed across fill media within the direct evaporative heat exchange section for cooling. Separate streams of ambient cooling air are simultaneously drawn into each of the heat exchange sections crosscurrently to evaporatively cool the evaporative liquid flowing within each section. The water cooled in the direct heat exchange section is then collected in a sump where it is allowed to mix and resultantly become uniform in temperature before being redistributed. The indirect heat exchange section is constructed from a series of spaced circuits having a continuous serpentine shape where the internal fluid to be cooled flows upwardly at a uniform rate and temperature from circuit to circuit. The apparatus can be used as a fluid cooler, an evaporative condenser, or as a wet-air cooler.

26 Claims, 10 Drawing Sheets

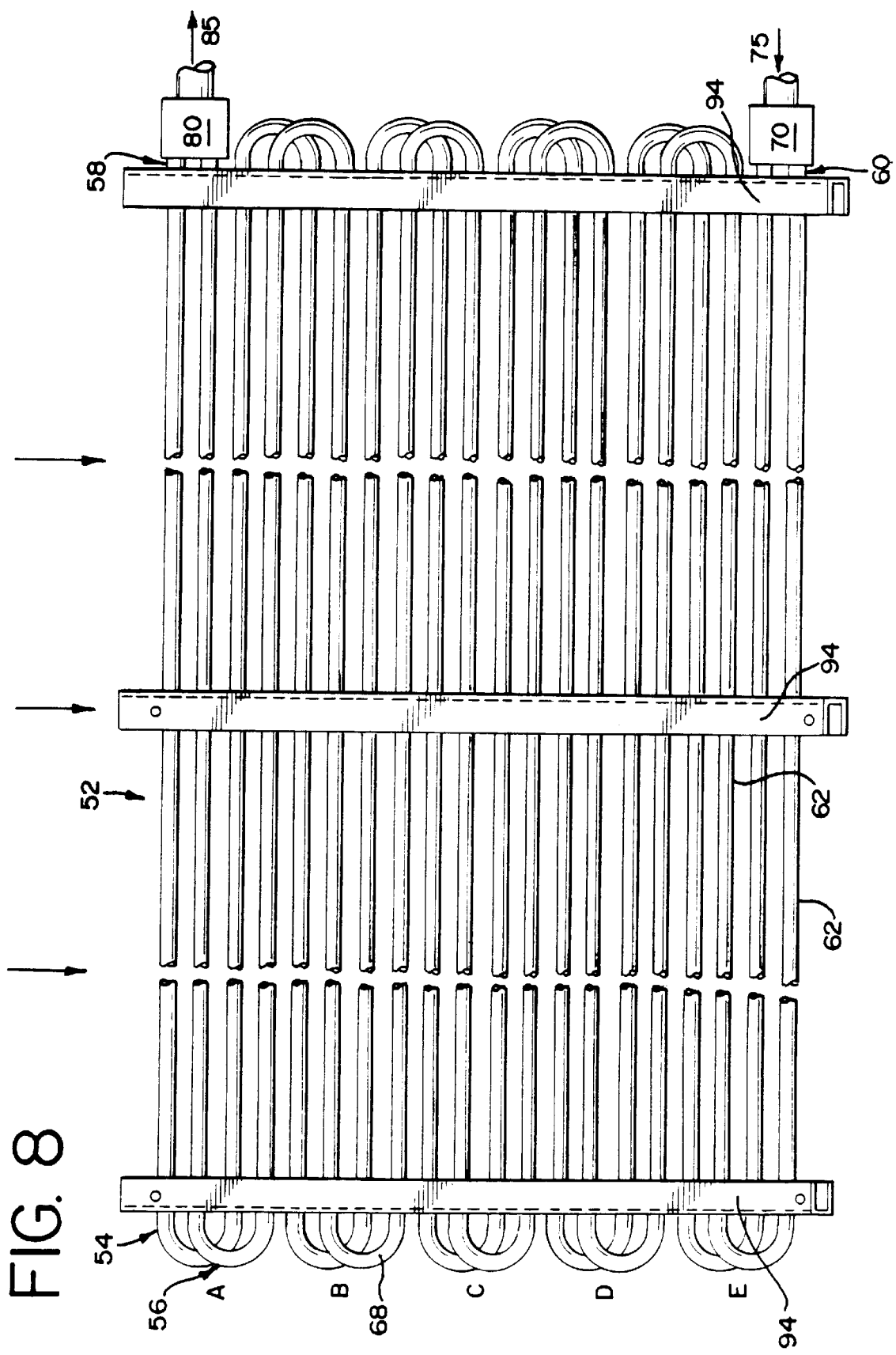

COMBINATION DIRECT AND INDIRECT CLOSED CIRCUIT EVAPORATIVE HEAT EXCHANGER

This is a division of application Ser. No. 08/078,629, filed on Jun. 16, 1993 now U.S. Pat. No. 5,435,382 filed Jul. 25, 1995.

FIELD OF THE INVENTION

The present invention relates generally to an improved heat exchange apparatus such as a closed-loop cooling tower, evaporative condenser, or wet air cooler. More specifically, the present invention relates to a group of unique combinations of separate indirect and direct evaporative fluid heat exchange sections arranged in such manner that a performance enhancing, initially uniform temperature evaporative liquid is distributed across the indirect heat exchange section. When compared to other similarly sized and currently commercially viable indirect evaporative heat exchange products, the present invention is capable of achieving greater heat transfer capability per unit size and cost.

In accordance with the present invention, an initially uniform temperature liquid is distributed over the outside surface of an indirect heat exchange section, which is comprised of a series of individual, enclosed circuits for conducting a fluid stream to be heated or cooled. When used as a closed loop cooling tower or evaporative condenser, heat is indirectly transferred from the fluid stream to the surrounding film of evaporative liquid. Part of the heat retained by the evaporative liquid is directly transferred to an air stream passing through the indirect evaporative heat exchange section, while the remaining portion of heat is stored as sensible energy, resulting in a temperature increase to the evaporative liquid. The stored sensible energy is then transferred in the direct evaporative heat exchange section to a second, separate air stream passing therethrough. The evaporative liquid draining from the direct evaporative heat exchange section is then collected in a sump and then pumped upwardly for redistribution across the indirect evaporative heat exchange section. When used as a wet air cooler, the direct and indirect evaporative heat exchange sections perform exactly as described above, except that now, the fluid stream entering the circuits is initially cold. Instead of releasing heat, as previously described, the fluid stream indirectly absorbs heat from the air streams passing through the direct and indirect evaporative heat exchange sections. The heat transferring processes are functionally performed exactly as described before, except that the cooled air stream is used in another process instead of a cooled fluid stream.

Depending upon the specific application, the fluid stream can be used to either liberate or absorb heat to the air stream, making the value of the heat exchanged to the air stream either positive or negative.

BACKGROUND OF THE INVENTION

More particularly stated, the present invention is concerned with a combination direct and indirect evaporative heat exchange apparatus and method which achieves maximization of the heat exchange efficiencies of both the indirect and direct evaporative cooling sections.

In a direct evaporative heat exchanger, only an air stream and an evaporative liquid stream are involved and the two streams evaporatively exchange heat when they come into direct contact with each other; the evaporative liquid is typically water. In an indirect evaporative heat exchanger, three fluid streams are involved; an air stream, an evaporative liquid stream, and an enclosed fluid stream. The enclosed fluid stream first exchanges sensible heat with the evaporative liquid through indirect heat transfer, since it does not directly contact the evaporative liquid, and then the evaporative liquid and the air stream evaporatively exchange heat when they directly contact each other.

Closed loop evaporative heat exchangers can be broadly grouped into three general categories: 1) Sensible heat exchanger-direct evaporative heat exchanger systems where one of the fluid streams from the sensible heat exchanger is piped to a direct evaporative heat exchanger; 2) Stand alone indirect evaporative heat exchangers; and 3) Combination direct and indirect evaporative heat exchangers.

Shell and tube refrigerant condensers or sensible heat exchangers which are connected to separate cooling towers are examples of the first group and they represent the predominantly used heat exchange methods in which evaporative cooling is normally utilized. Products referred to as "coil sheds" are also part of this first group, and coil sheds consist of a cooling tower (direct evaporative heat exchanger) located directly above a non-ventilated coil section (sensible heat exchanger).

Stand alone indirect evaporative heat exchangers represent the next group and these devices are typically not as popular as those of the first group. The majority of evaporative condensers and evaporative fluid coolers are of this type. Products with the air and evaporative liquid streams in counterflow, crossflow or concurrent flow are commercially available, although the counterflow design predominates.

The last and currently least popular group involves products which combine both indirect and direct evaporative heat exchange sections. The present invention is part of that group and it represents a unique improvement over the prior art in this group by offering the most efficient way to construct closed loop evaporative heat exchangers.

When the invention is used as a closed circuit cooling apparatus, such as a closed loop cooling tower, an initially hot fluid, usually water, is generally directed upwardly through a series of circuits which comprise an indirect evaporative heat exchange section, where the hot water undergoes indirect sensible heat exchange with a counterflowing, cooler evaporative liquid gravitating over the outside surfaces of the circuits. In the preferred embodiment, the coldest water leaving each of the circuits is equally exposed to the coldest uniform temperature evaporative liquid and coldest uniform temperature ambient air streams available. This leads to a more uniform and necessarily more efficient method of heat transfer than accomplished by the prior art. As heat is transferred sensibly from the hot fluid, the evaporative liquid increases in temperature as it gravitates downwardly through the indirect evaporative heat exchange section. Simultaneously, cooler ambient air is drawn down over the circuits in a path that is concurrent with the gravitating evaporative liquid. Part of the heat absorbed by the evaporative liquid is transferred to the concurrently moving air stream, while the remainder of the absorbed heat results in an increase of temperature to the evaporative liquid as if flows downwardly over the circuits. The evaporative liquid then gravitates over a direct evaporative heat exchange section. The direct evaporative heat exchange section utilizes a separate source of cool ambient air to directly cool the now heated evaporative liquid through evaporative heat exchange. Air flow through the direct section is either crossflow or counterflow to the descending evaporative liquid. This now cooled evaporative liquid is then collected in a sump, resulting in a uniform temperature cooled evaporative liquid which is then redistributed to the top of the indirect evaporative section.

When applied as an evaporative condenser, the process is the same as explained for the closed circuit fluid cooling apparatus except that since the refrigerant condenses at an isothermal condition, the flow of the fluid, now a refrigerant gas, is typically reversed in order to facilitate drainage of the condensate.

When applied as a wet air cooler, either with an initially cold single phase fluid or an evaporating refrigerant the process is the same as explained earlier for the fluid cooling or condensing applications, respectively, except that the heat flows in the opposite direction.

Prior art combinations of direct and indirect evaporative heat exchange sections (U.S. Pat. Nos. 4,112,027, 4,683,101, and 3,141,308) teach us to place a crossflow direct evaporative section above the indirect section. However, the direct-over-indirect arrangement taught by either disclosure unfavorably results in a temperature gradient being formed in the cooling water as it descends through the direct evaporative section. The gradient forms when the crosscurrently flowing cooling air absorbs heat from the descending water, creating uneven heat exchange and resultant non-uniform temperature water along the longitudinal extent of the direct section. As discovered by U.S. Pat. No. 4,683,101, this gradient in water temperature can be in the order of 6°–10° F. across the depth of the direct section, and when the direct section is directly above the indirect section, the non-uniform temperature water drains directly onto the series of underlying circuits comprising the indirect section thereby creating non-uniform heat transfer from circuit to circuit. Those in the art know that the non-uniform heat transfer in this instance is a source of overall thermal inefficiency to the tower. Furthermore, the non-uniform heat transfer represents additional operational inefficiencies in a condensing application because liquid condensate will back up within the unevenly loaded circuits and limit the surface area available for condensing. The prior art U.S. Pat. No. 4,683,101 tried to address this problem by physically changing the orientation of the indirect heat exchange circuits, as well as the internal fluid flow direction within the circuits so that the hottest fluid to be cooled within the circuits was in thermal exchange with the hottest temperature of cooling water within the gradient. However, that arrangement failed to address the water temperature gradient problem itself and therefore, neglected the effects it had on heat exchange within the indirect heat exchange section.

In the closed circuit fluid cooling tower of the present invention, it was discovered that distributing an initially uniform temperature evaporative liquid over the indirect evaporative heat exchange section had a substantial effect upon the uniformity of heat exchange within that section. This invention also discovered that if the indirect heat exchange section no longer had the direct heat exchange section immediately lying above it, added advantages in cooling efficiency could be realized from various air and water flow schemes.

SUMMARY OF THE INVENTION

It is therefore an object of the present invention to provide a two-section evaporative fluid cooling, evaporative condensing or wet air cooling apparatus and method, whereby an indirect heat exchange section and a direct heat exchange section are operationally combined to deliver excellent total heat transfer performance.

It is another object of the present invention to provide a single heat exchange apparatus which can operationally incorporate the benefits of sensible and evaporative heat exchange phenomena within each of the heat exchange sections, thereby maximizing the enthalpy and corresponding temperature differentials within each of the heat exchange sections.

It is a related object of the present invention to provide a heat exchange apparatus wherein the thermal heat exchange through the indirect heat exchange section is substantially uniform from circuit to circuit as a result of each circuit simultaneously experiencing the same temperature of cooling water at any vertical point in the indirect heat exchange section.

It is a final object of the present invention to provide a heat exchange apparatus wherein the cooling water exiting the direct evaporative heat exchange section is collected and allowed to mix in order for the temperature of the water to equalize into a single, uniform temperature before it is redistributed to the indirect heat exchange section, thereby eliminating a substantial cause of non-uniform heat transfer within the indirect heat exchange section.

BRIEF DESCRIPTION OF THE DRAWINGS

In the drawings:

FIG. 8 is a front view of the indirect heat exchange section showing the staggered relationship between adjacent circuits and the arrangement of the inlet and outlet headers;

DESCRIPTION OF THE PREFERRED EMBODIMENT

Figure 5:
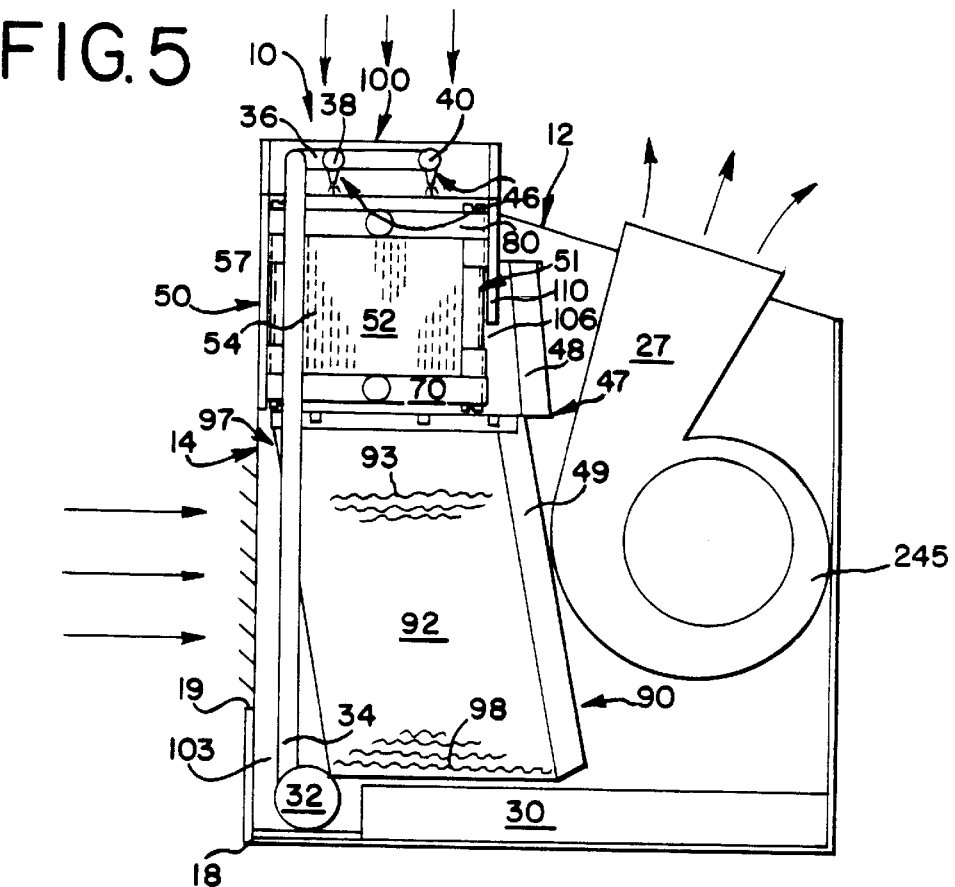
FIG. 5 shows an embodiment of the present invention utilizing a centrifugal fan.
Figure 1:
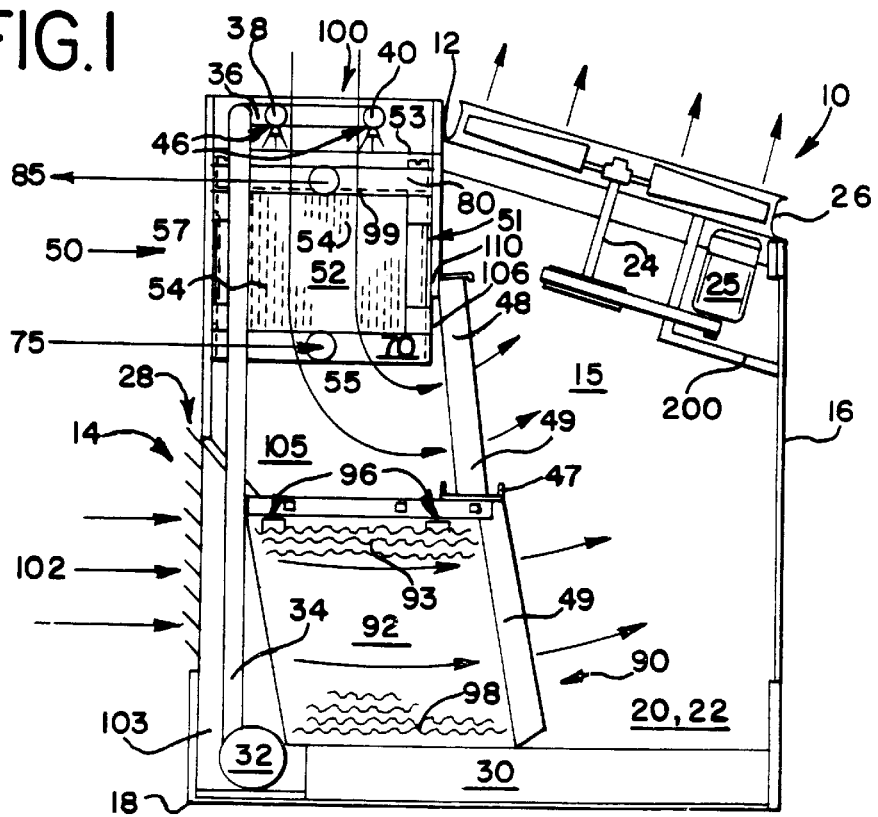
FIG. 1 is a side view of the preferred embodiment of the closed-loop cooling tower of the present invention having a single coil indirect evaporative heat exchange section disposed above the direct evaporative heat exchange section, with the air and water flow directions within each of said sections being respectively concurrent and crossflow.

Referring now to FIG. 1 of the drawings, the heat exchange apparatus 10 in accordance with the invention is shown and is well known in the art as a closed-circuit cooling tower. Generally, apparatus 10 includes an enclosure structure which contains a multi-circuit indirect evaporative fluid cooling section 50, a direct evaporative heat exchange section 90, a lowermost evaporative liquid collection sump 30, and an uppermost distribution means 36 for spraying an evaporative liquid downwardly through apparatus 10, and a fan means 24 for moving a stream of air through each of the heat exchange sections 50 and 90, although natural draft is also a viable means for moving the air. Fan 24 can either be an induced or forced draft centrifugal fan or a common propeller type of fan, any of said fan choices requiring fan motor 25 to power them. FIG. 5 shows apparatus 10 being used in combination with an induced draft centrifugal fan 245, the centrifugal fan application being most suited for situations requiring either less noise generation or the ability to overcome larger external static pressure heads. Again referring to FIG. 1, motor 25 can be mounted within enclosure passageway 15 if an appropriate wet condition motor casing or a protective cover is used, or it can be mounted on the outside of the structure if desired. Here it is shown in the air stream in moisture proof box 200.

It is important to understand that apparatus 10 has many applications in the heat exchange field and that each application will use all of the same above-mentioned elements, although the operation of those elements might vary slightly from one type of application to the other. For example, apparatus 10 may be used to cool a single phase, sensible fluid such as water, which is flowing within an externally-supplied closed circuit system, or it may be used to desuperheat and condense a multi-phase, sensible and latent fluid such as a refrigerant gas, also supplied from an external closed-circuit system. Finally, the operable field of use for apparatus 10 also includes duty as a wet air cooler, where the air discharged into passageway 15 is piped offsite to be used as a fresh, cooled air supply for an operation such as mining.

Figure 2:
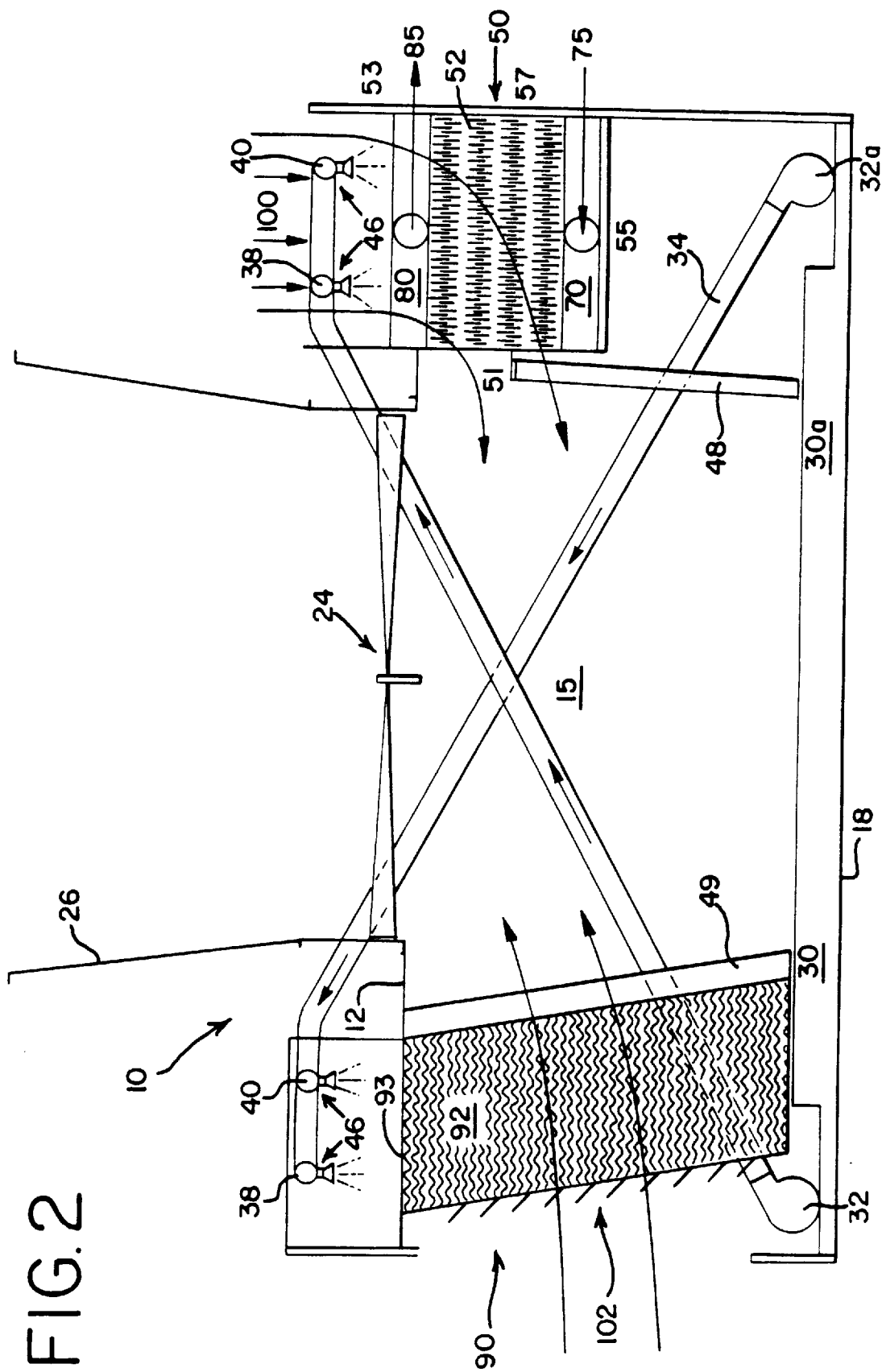
FIG. 2 shows the embodiment of FIG. 1, with the indirect and direct heat exchange units disposed side-by-side.
Figure 3:
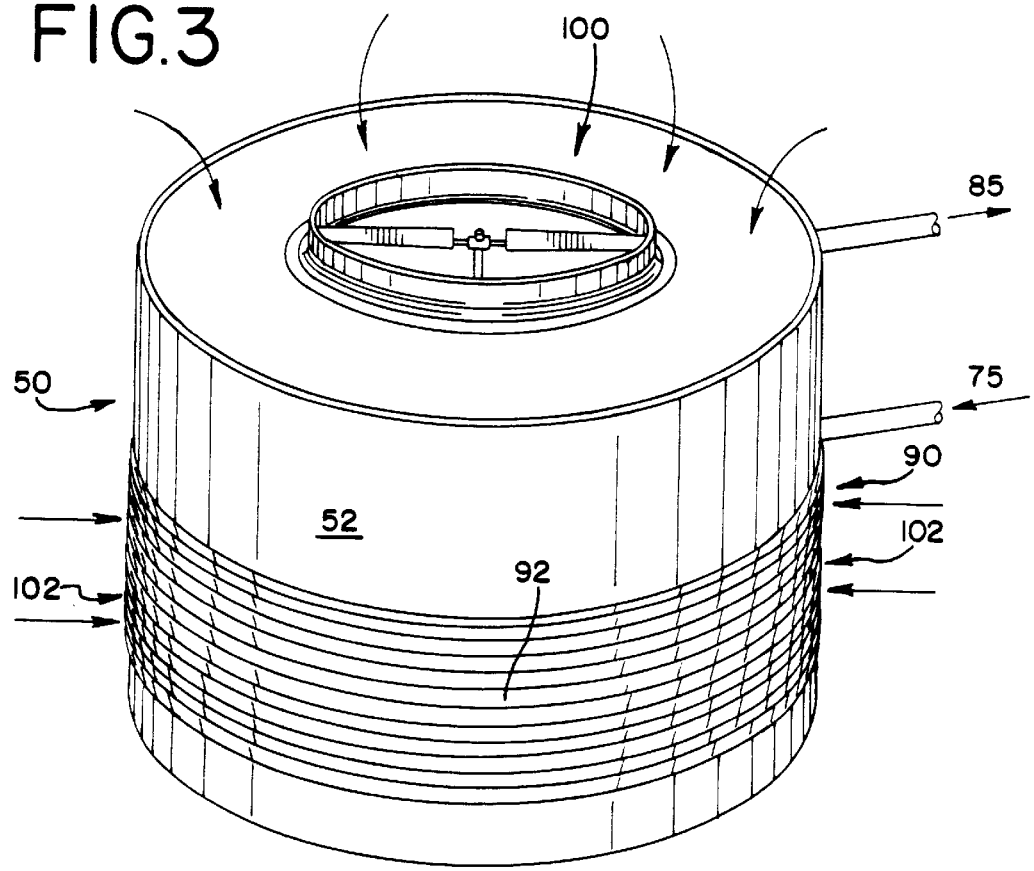
FIG. 3 shows an embodiment of the present invention when arranged inside a round enclosure structure.

As will become evident, the tower structures containing the above-mentioned components can also be arranged and formed in a number of different ways; apparatus 10 is not limited to strictly one shape or arrangement. This is best seen in FIGS. 1–3, where the rectangular stacked, the rectangular side-by-side, and the round stacked versions, hereinafter referred to as single coil towers, are all shown. In accordance with the present invention, each of those embodiments operably performs in substantially the same way, although their final heat exchange capacities will vary slightly, as will be better understood from the more detailed description of each.

In accordance with one embodiment of the present invention illustrated in FIG. 1, the enclosure structure comprising apparatus 10 is shown with a generally rectangular shape which includes an upper roof surface 12, a base 18, a front wall 14, a rear wall 16, a first side wall 20 and a second side wall 22. The side walls 20,22 and rear wall 16 are continuously solid panel members made from materials such as sheet metal, fiberglass, plastic, or the like, and these walls have corrosion resistant properties, as does front wall 14 and roof surface 12.

The rectangular enclosure structure of FIG. 1 contains an indirect heat exchange section 50, which is comprised of a single coil assembly 52, superposed above the direct evaporative heat exchange section 90. The indirect heat exchange section 50 is typically of a rectangular shape, having an inboard side 51, an outboard side 57, a top side 53 and a bottom side 55. The indirect heat exchange section coil assembly 52 receives a flowing hot fluid to be cooled from an offsite process and it is cooled in this section by a combination of indirect sensible heat exchange and a direct evaporative heat exchange. The evaporative liquid, which is usually cooling water, is sprayed downwardly by distribution means 36 onto the indirect section, thereby exchanging indirect sensible heat with the fluid to be cooled, while the stream of ambient air entering primary air inlet 100, evaporatively cools the water as the two mediums move downwardly through coil assembly 52. In this particular embodiment, the entering air stream is shown entering and flowing in a direction which is parallel or concurrent with the direction of cooling water, although the air flow stream is not limited to any particular flow pattern, as will become evident later on where a crosscurrent air flow pattern will be explained. Once the air and water cooling mediums reach bottom side 55 of indirect section 50, they split, with the air stream being pulled into plenum 105 and then into passageway 15 by fan 24, while the water gravitationally descends into direct heat exchange section 90. The air is then discharged from apparatus 10 through the fan cylinder 26, while the water is cooled in the direct heat exchange section as will be explained shortly. It is also important to note that the air stream entering inlet 100 supplies air that will only be used for cooling purposes in the indirect heat exchange section, regardless of the actual air flow pattern through said section.

The direct evaporative heat exchange section 90 functions to cool the water that is heated and descending from the indirect heat exchange section 50. Direct evaporative heat exchange section 90 is comprised of an array of tightly-spaced, parallel, plastic sheets 93 which form fill bundle 92, although fill 92 could be formed by conventional splash-type fill. The hot water received by fill bundle 92 from indirect section 50 is distributed across each fill sheet 93 so that a source of outside ambient air which enters secondary air inlet 102, evaporatively cools the hot water descending the sheets. Here, the ambient air stream is shown entering direct section 90 in a crosscurrent fashion to the descending hot water draining through the fill bundle 92, although other air flow schemes can be used, as will be seen later. The plastic fill sheets 93 are usually hung from beams 96 that are connected to and traverse sidewalls 20 and 22. Each sheet 93 has a generally continuous, waved pattern of grooves running the entire length of the sheet to aid in spreading the downflowing hot water into a thin film, thereby providing a larger exposed surface area for the air stream to interact with and evaporatively cool. Fill sheets 93 are preferably made from a polyvinyl chloride material, although other types of plastics could be used. As determined by FIG. 1, secondary ambient air inlet 102 provides ambient air that is strictly dedicated for evaporative cooling purposes in the direct heat exchange section only.

As further seen from FIG. 1, it is typical to cover the secondary air entryway 102 with a series of louvers 28 for proportioning the air flow into fill bundle 92. Typically, louvers 28 are motorized so that during cold weather, the louvers are completely closed and the cooling water system is shut off in order to operate cooling tower 10 as an all dry tower. The ambient air entering through louvers 28 initially flows across the secondary air plenum 103 before entering fill bundle 92 in a crosswise or crosscurrent fashion to the hot water downwardly gravitating through the plastic fill sheets 93. As mentioned, the stream of cold air passing over the film of hot water evaporatively removes heat from the water, thereby cooling the hot water by well known evaporative effects. The heated air exiting evaporative cooling section 90 then passes through secondary drift eliminator 49 before entering passageway 15, where it is forced by fan 24 to upwardly change directions for discharge to the atmosphere through fan cylinder 26. Since the air leaving the direct water evaporative cooling section 90 becomes saturated with moisture absorbed from the cooling water, the secondary drift eliminator 49 is interposed between the fill bundle 92 and passageway 15 to facilitate in removing the water droplets entrapped in the air stream. Drift eliminator 49 is typically comprised of closely spaced metal, plastic or wood slats or louvers which permit air flow therethrough, but will collect the fine water droplets in the air. The collected water then gravitates down eliminator 49, directly into underlying collection sump 30 for recirculation.

As seen in FIGS. 1–6, the entire base 18 of apparatus 10 is substantially comprised of a water collection sump 30 which is typically disposed only below direct evaporative heat exchange section 90, although it truly depends upon how the components are arranged within the structure of apparatus 10, as is apparent by FIG. 2, where the direct and indirect sections are side-by-side. The side-by-side or indirect-over-direct arrangements merely emphasize that the most important feature of the present invention is that the heated cooling water descending from the direct evaporative heat exchange section 90 is allowed to mix in sump 30 so that it can attain a uniform temperature before being pumped for use again in the indirect heat exchanger section 50. As seen, vertically extending recycle piping 34 operably connects cooling water distribution means 36 with pump 32 and sump 30. Pump 32 is arranged outside of sump 30, near the corner of front wall 14 so that it can be easily serviced.

Distribution means 36 is generally located above the single coil assembly 52 of indirect evaporative cooling section 50, which is also in positional relationship with primary ambient air inlet 100. Distribution means 36 consists of identical cooling water distribution legs 38 and 40, each of which laterally transverses the width of tower 10 in a spaced, parallel relationship from each other and from front wall 14. Each distribution leg 38 and 40 is constructed from pipe and has a series of equidistantly spaced spray nozzles 46 attached along the bottom of the pipe for evenly distributing the cooling water across the top side 53 of indirect evaporative heat exchange section 50 and generally across primary air inlet 100. Depending upon the heat exchange capacity required from apparatus 10, the number of water distribution legs can vary from 1 to 5 legs per indirect evaporative coil section 52, with the length of each leg varying between 3–24 feet. Typically, the number of nozzles 46 per coil assembly 52 of indirect section 50 will vary between 9–180 nozzles, also depending upon the tower capacity. Likewise, pump 32 is sized according to tower capacity such that the continuous supply of cooling water pumped to spray nozzles 46 will produce a fine spray of water across the entire span of the primary air inlet 100 and hence, across the single coil assembly 52. Similarly, an upper drift eliminator 48 is interposed between side outlet opening 106, plenum 105 and passageway 15 to remove the water droplets entrapped by the primary air stream while evaporatively cooling the water descending through indirect heat exchange section 50. Pan 47 is disposed below upper drift eliminator 48 for collecting the water from mist eliminator 48 and gravitationally dispensing it upon fill sheet bundle 92. It is to be understood that the opening which defines primary ambient air inlet 100 has a dimensional length and width equal to that of the indirect evaporative cooling section 50 no matter where the entry is located. From FIG. 1, it is seen that the entering air stream initially approaches entryway 100 generally perpendicular to the top side 53 of indirect heat exchange section 50, substantially concurrent with the water sprayed downwardly from distribution means 36. And in FIG. 4, it is seen that the air stream approaches entryway 100 generally perpendicular to the outboard side 57, substantially crosscurrent with the downwardly sprayed water.

Figure 7:
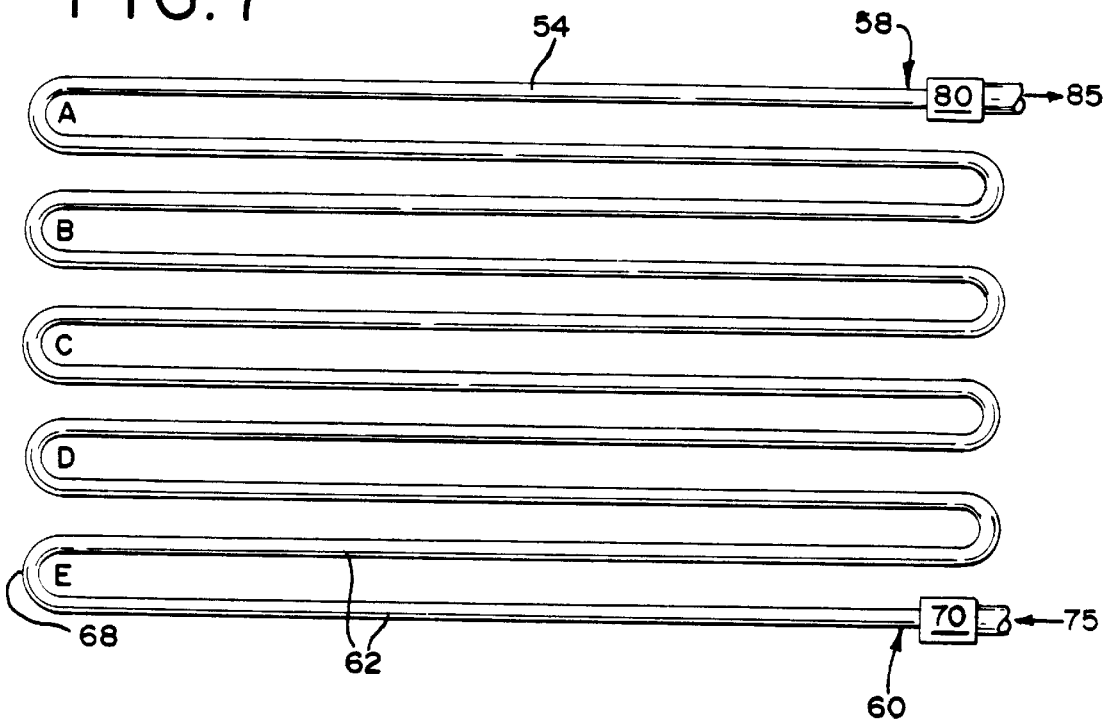
FIG. 7 is a front view of a single serpentine shaped circuit of the indirect heat exchange section.
Figure 9:
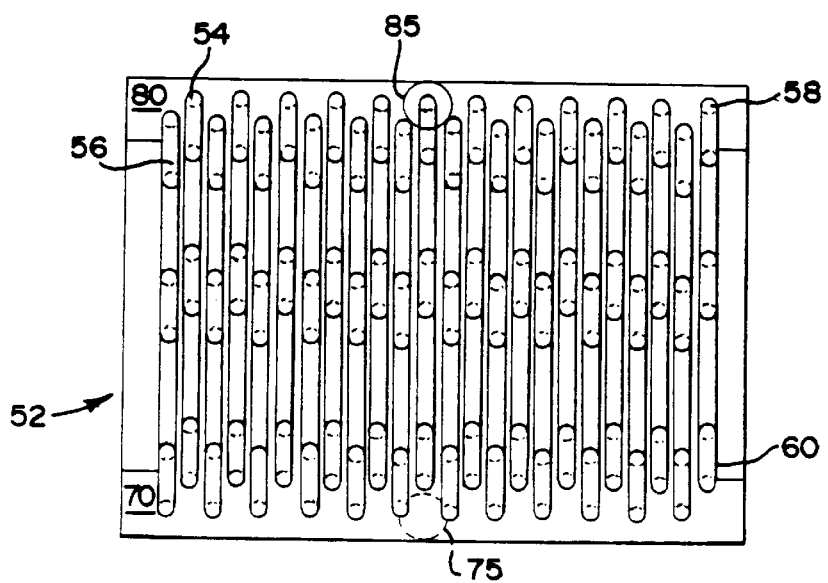
FIG. 9 is a side view of the indirect heat exchange section emphasizing how the series of circuits presents an entire face of heat exchange surface to the inlet air and water.

Referring now to FIGS. 7, 8, and 9 in general, the single coil assembly 52 of the indirect evaporative cooling section 50 will now be explained in greater detail. More particularly seen in the side view of FIG. 9, the single coil assembly 52 is preferably a generally rectangularly shaped structure comprising a series of horizontally and closely spaced parallel circuits 54 and 56 of serpentine shape. All circuits 54,56 have a circuit top end 58 and a circuit bottom end 60 connected to a top fluid header 80 and to a bottom fluid header 70, respectively. In this particular application, where apparatus 10 is being used as a fluid cooling device, bottom header 70 actually serves as the hot fluid inlet supply header and top header 80 serves as the cooled fluid outlet header. It should be understood that the supply/discharge functions of each of the headers could change, depending upon the actual use of apparatus 10, i.e., if it is being used as an evaporative condenser. In that case, the hot gas would enter indirect coil assembly 52 at the top side, where top header 80 would now serve as the supply header. FIG. 7 shows that each of the headers 70 and 80 are rectangularly shaped with both headers located on the same sides or ends of the single coil assembly 52. Referring to both FIGS. 7 and 9, it is also seen that bottom inlet header 70 consists of a single supply branch 75, connected generally to the center of inlet header 70 and on the opposite header side wall to which the individual inlet circuits ends 60 are connected. The single inlet supply branch 75 supplies the fluid to be cooled in a generally parallel or concurrent direction to the direction of the fluid flowing inside the series of circuits. An even flow rate through circuits 54,56 is important to the proper operation of the indirect heat exchange section and to the overall performance of apparatus 10, as will be understood later through a detailed operational explanation. Top outlet header 80 also has a single branch 85 generally attached at the center of header 80, and it is seen that this branch is horizontally spaced directly above inlet supply branch 75 so that the cooled fluid exiting coil assembly 52, exits in a direction generally parallel, yet opposite to the fluid flowing within inlet supply branch 75.

Referring now to FIG. 8, it is seen that each individual circuit 54,56 within the single coil assembly 52 consists of a single, continuous length of coil tubing that is subjected to a bending operation which forms the tubing into several U-shaped rows A–E, that are in a vertical and equally-spaced relationship from each other, thereby providing each circuit 54,56 with a resultant serpentine shape. Each row is of substantially the same dimensional length, with each individual row generally comprising two straight tubing run sections 62 connected together by a generally U-shaped return section 68. By forming each row and each of the circuits 54,56 in exactly the same way, the heat load between alternating circuits 54,56 will effectively remain constant, as long as all other factors between the circuits such as temperature and flow rates are equal. As FIGS. 7 and 8 show, indirect heat exchange assembly 52 is constructed with five rows, A–E, but the exact number of rows will depend upon the amount of heat transfer surface area required for each particular application. That determination is made by commonly known engineering heat transfer principals. Tubing runs 62, and for that matter, each of the individual rows A–E, substantially span between side walls 20 and 22 and depending upon the overall size of the indirect evaporative cooling section 50, might require at least two structural supports 94 on each end of the rows to keep the tubes from sagging. The supports will also ensure proper tube spacing between the adjacent individual circuits 54,56. Without proper spacing, uniform heat transfer throughout the indirect evaporative heat exchange section 50 would not be possible.

Still referring to FIG. 8, it is also clear to see how each individual circuit 54,56 is attached to the inlet and outlet headers 70 and 80, respectively, by inserting and attaching circuit inlet end 60 and outlet end 58, into the sidewall of respective inlet and outlet headers 70 and 80, and then preferably welding the tubing/header interface together, although other methods of attachment, such as rolling the tubes into the header, could be used. Note the heavy arrows in FIG. 8; they represent the preferred direction of entering air and evaporative cooling water, which can be seen in FIG. 1. All adjacent circuits 56 within the series of circuits comprising assembly 52 are slightly staggered lower than the starting circuits 54, and as FIG. 8 only represents two circuits side-by-side in close tolerance, FIG. 9 best shows the spacing within the series arrangement. Depending upon the heat exchange capacity of apparatus 10, the number of individual circuits 54,56 can range from 23 to 56 circuits per single coil assembly 52, and cooling apparatus 10 could actually contain multiple single coil assemblies 52 stacked on top of each other if greater capacity is needed. No matter how many circuits are utilized, it is seen from FIG. 9 that the spacing between circuits is of very tight tolerance such that the entire series of individual circuits 54,56 effectively performs or functions as a continuous, or uninterrupted thermal face of heat exchange area per individual row when it is interacting with the entering primary air stream and cooling water. In the practice of this particular invention, the physical arrangement for the individual circuits comprising the indirect cooling section 50 is a factor which will help attain maximization of the cooling efficiencies of each heat exchange section 50 and 90, and of apparatus 10 as a whole, as will now be explained.

The continuous operation of the apparatus shown in FIG. 1 as a single phase fluid cooler proceeds as follows. Hot fluid to be cooled is supplied to header 70 at the bottom side 55 of single coil heat exchange assembly 52 by supply conduit 75. The hot fluid evenly distributes itself within header 70 and into each of the attached, staggered pairs of individual circuits 54,56 so that fluid flows upwardly at a substantially uniform flow rate within the entire series of circuits comprising single coil assembly 52. As the fluid moves upward, it effectively moves as a continuous plane or sheet of fluid until all of the tubing runs 62 on each of the top rows A, of top side 53 of indirect heat exchange section 50 are generally equally exposed to simultaneous contact with the primary ambient air stream entering air inlet 100 and to the uniform temperature of cooling water downwardly sprayed from sprays 46 of distribution means 36. Fan 24 induces the cold ambient air stream into primary air inlet 100 at an angle substantially perpendicular to the entire series of circuits comprising the top side 53 of indirect section 50. Likewise, the coldest available cooling water from direct evaporative section 90, is ejected downwardly from sprays 46 generally into air inlet 100 and generally across top side 53 of indirect heat exchange section 50. As previously mentioned, when the cooling water descends from bottom fill member 98, its temperature varies along the longitudinal extent or depth of direct section 90, and only because the water is collected and allowed to mix within sump 30, does it have a uniform temperature when later pumped to means 36.

In this particular embodiment, the primary air and cooling water streams concurrently flow together and simultaneously impinge upon all top rows(A) of all circuit pairs 54,56 which comprise the series of circuits in indirect coil assembly 52. More particularly, since the entire series of circuits initially experience uniform temperature water and air streams flowing downwardly in the same direction, and since the temperature of the fluid within the circuits is substantially constant across the series of circuits at any given horizontal or vertical point within the coil assembly, the air and water flow streams absorb heat uniformly as they progress downwardly through coil assembly 52; necessarily meaning that the circuits substantially undergo an equal rate and quantity of heat exchange from circuit to circuit also. By this, it is not meant that the air and water streams are absorbing equal amounts of heat, for it is known that the water will absorb substantially greater amounts of heat than the air, thereby having a substantially greater role in affecting the uniformity of performance. Rather, it is meant that each of the cooling mediums will independently absorb heat at a constant rate from circuit to circuit at any horizontal or vertical point within the indirect heat exchange section 50. The uniformity of performance throughout the vertical and horizontal directions of the indirect heat exchange section 50 is important when trying to maximize the heat exchange in this section. However, it is important to understand that the uniform temperature water plays the major role in creating this minimization since a substantially greater majority of heat exchange occurring in indirect section 50 is through indirect sensible heat exchange between the cooling water and the fluid to be cooled. This means that the air flow pattern through the indirect section 50 has a much lesser effect on uniformity, no matter what air flow pattern is chosen. However, an added feature of this particular embodiment, where a concurrent air flow pattern is used, is that the air stream pattern boosts the maximization and uniformity from circuit to circuit somewhat. For example, if the air entered the indirect section 50 through the outboard side 57 of coil assembly 52, as in FIG. 4, it would become hotter during its travel towards inboard side 51, assuming of course that the circuits were still oriented transversely across the width of the tower. Moreover, as the air traveled inward and became heated, the heat exchanged between the air and the descending cooling water would no longer be uniform across the longitudinal width or extent of indirect section 50, and this air temperature gradient would likewise affect the amount of heat which the water would absorb. Unlike the embodiment of FIG. 1, the heat exchanged in the FIG. 4 embodiment would be nonuniform in the vertical direction too since the amount of heat being exchanged between the air and water at the top side 53, would be less than that at the bottom side 55.

Returning to FIG. 1, it should also be understood that the entire top series of circuits operationally contain the coldest fluid to be cooled when the fluid reaches top side 53 for contact with the entering air and water. The coldest available cooling water contacts the series of circuits causing the temperature of the fluid within the circuits to nearly approach that of the cooling water. As mentioned, the cold, uniform temperature water impinging upon the tubing circuits is in indirect sensible heat exchange with the internally flowing fluid to be cooled, while the concurrently flowing air stream, evaporatively cools the now-heated cooling water as both mediums continue their downward travel through the indirect heat exchange section 50. In order to fully promote the evaporative heat exchange between the air stream and the evaporative liquid, the air stream completely travels through indirect section 50, then enters plenum space 105 before being discharged.

Prior art indirect heat exchanger arrangements were not able to maximize the surface area which simultaneously experienced the coldest water and/or the coldest air, as with the arrangement of the preferred embodiment, illustrated in FIG. 1. The tower of U.S. Pat. No. 4,112,027 did nothing to address the temperature gradient in the cooling water, hence none of the circuits ever experienced uniform heat exchange from circuit to circuit. In U.S. Pat. No. 4,683,101, the gradient problem was recognized and addressed by exposing all of the circuits containing the coldest fluid to be cooled to the coldest available air, but since the water temperature gradient was not eliminated, only one row was ever exposed to the coldest cooling water. More importantly, since the gradient was not eliminated and since the water plays the substantial role in controlling circuit to circuit heat exchange uniformity, this design produced non-uniform performance in both the horizontal and vertical directions within the indirect section.

In the present invention, placing the direct evaporative heat exchange section 90 below the indirect section 50 allows use of sump 30 as a convenient means for averaging the temperatures of all the various water temperature droplets falling from bottom row 98 together before spraying means 36 distributes the water at a uniform temperature onto the indirect section 50. As mentioned, the water temperature uniformity is the most important feature of the invention, even when comparing the present invention to prior art closed circuit cooling towers which utilized intermixed direct/indirect heat exchangers throughout the tower since those arrangements still experienced water temperature gradients. With the present invention, it was realized that if the indirect heat exchange section was located above the direct section, or even in a side-by-side arrangement, the water temperature gradients were no longer a concern and now the best air flow schemes and coil assembly arrangements could be determined, leading to the preferred embodiment of FIG. 1.

Figure 10:
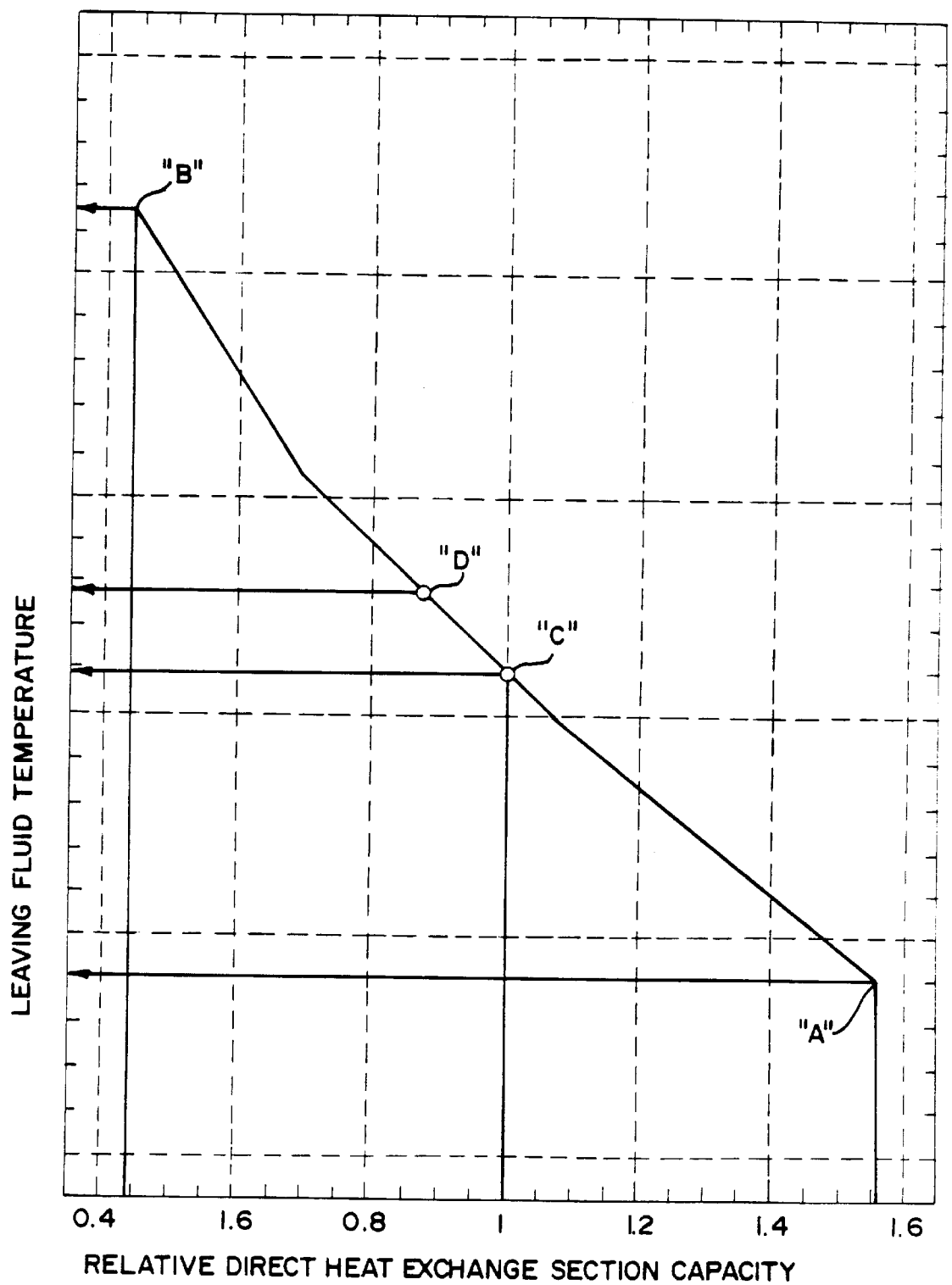
FIG. 10 is a graphical representation illustrating the cooling characteristics of a closed circuit cooling tower in accordance with the present invention as compared to a fluid cooler of this type using a non-uniform cooling water.

In order to demonstrate the significance of the initially uniform temperature evaporative liquid with respect to the cooling capacities of the indirect heat exchange section, FIG. 10 has been provided. FIG. 10 is a plot of the final fluid temperature leaving the indirect section versus the relative heat exchange capacity of the direct section when the apparatus is applied as a closed loop cooling tower. As previously described, the fluid flow rate through each circuit in the indirect section is generally equal and the inlet fluid temperature is likewise so. As shown by the plot, as the capacity of the direct section is increased, the fluid temperature of the exiting fluid decreases. From the perspective of this invention, and through use of this plot, the benefit of uniform versus non uniform temperature evaporative liquid will be graphically demonstrated. In prior art systems, the gradient in the initial temperature of the evaporative liquid falling from the crossflow direct section onto the indirect section essentially subjected the individual circuits of the underlying indirect section to several different capacity direct sections. As previously discussed, the evaporative fluid temperature gradient is caused by the increase in air temperature as the air flows across the gravitating evaporative fluid. The circuits on the outboard side of the underlying indirect section were subjected to colder water falling from the higher capacity outboard side of the direct section, while the circuits on the inboard side were subjected to warmer water falling from the lower capacity inboard side of the indirect section. The relative capacities of the outboard and inboard sides of the direct section are shown as points "A" and "B" respectively on FIG. 10. In this example, the outboard and inboard circuits would then produce different leaving-fluid-temperatures, with the outboard side temperatures being substantially colder. Accordingly, there would also be a mixed average fluid temperature leaving the indirect section instead of a single, uniform temperature, as with the present invention.

On the otherhand, with the apparatus incorporating the present invention, the evaporative liquid cooled by the direct section is now an average of the inboard and outboard side capacities before it is sprayed on the indirect section; this average is represented as point "C" on the plot. When this initially uniform temperature evaporative liquid is sprayed over the indirect section, all the circuits in the indirect section now produced a colder fluid exit temperature than the mixed average achievable with the prior art configuration. The reason is due to the fact that in the prior configuration, some of the fluid in the indirect section is cooled below the mixed average temperature of the present invention and some of it is heated above that same mixed average. As can be seen when measuring physical distances off the plot, the required relative capacity of the direct section required to produce a leaving fluid temperature a fixed number of degrees below the average mixed fluid temperature, is not equally offset by the smaller reduction in relative capacity of the direct section required to produce a leaving fluid temperature at the same fixed number of degrees above the mixed average. Thus when that same average direct section capacity is applied equally to all circuits, as with the present invention, not only can the present invention handle a greater load, but it also can deliver that load at a colder leaving temperature. Alternatively, as shown by point "D", if the present invention was equipped with a direct evaporative section which is 13% smaller than the equivalent one in the prior art device, the same capacity as the prior art device could be provided.

Figure 4:
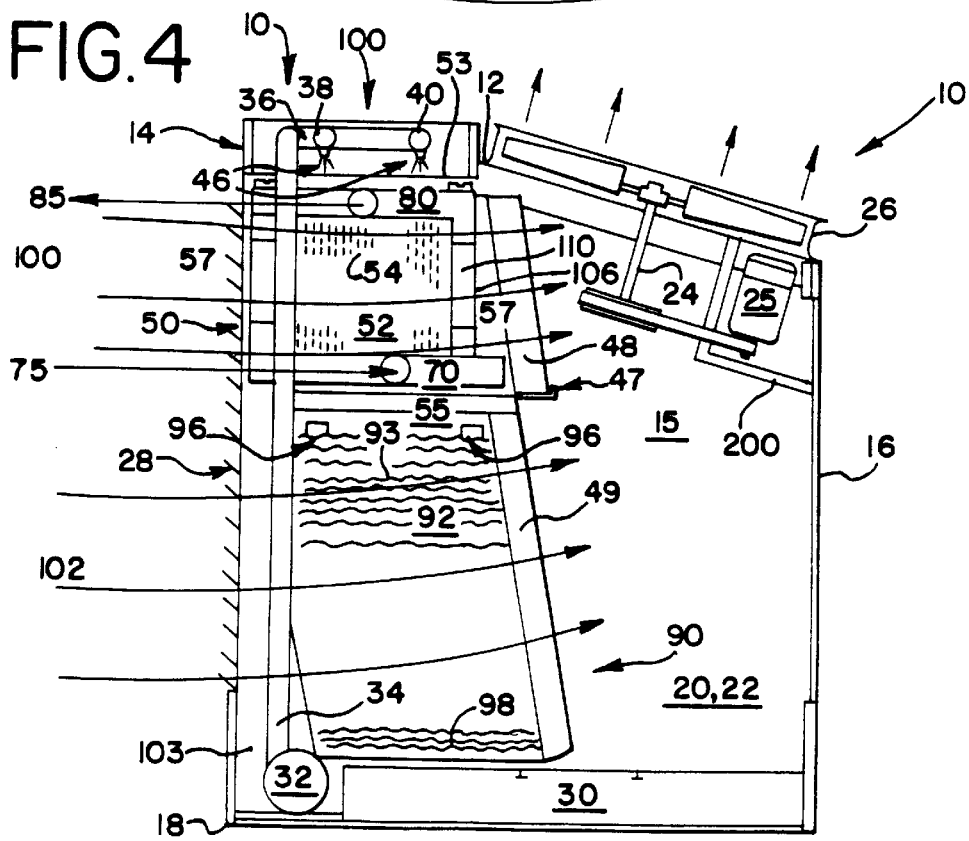
FIG. 4 shows an embodiment of the present invention with both heat exchange sections utilizing a crosscurrent air flow stream.
Figure 6:
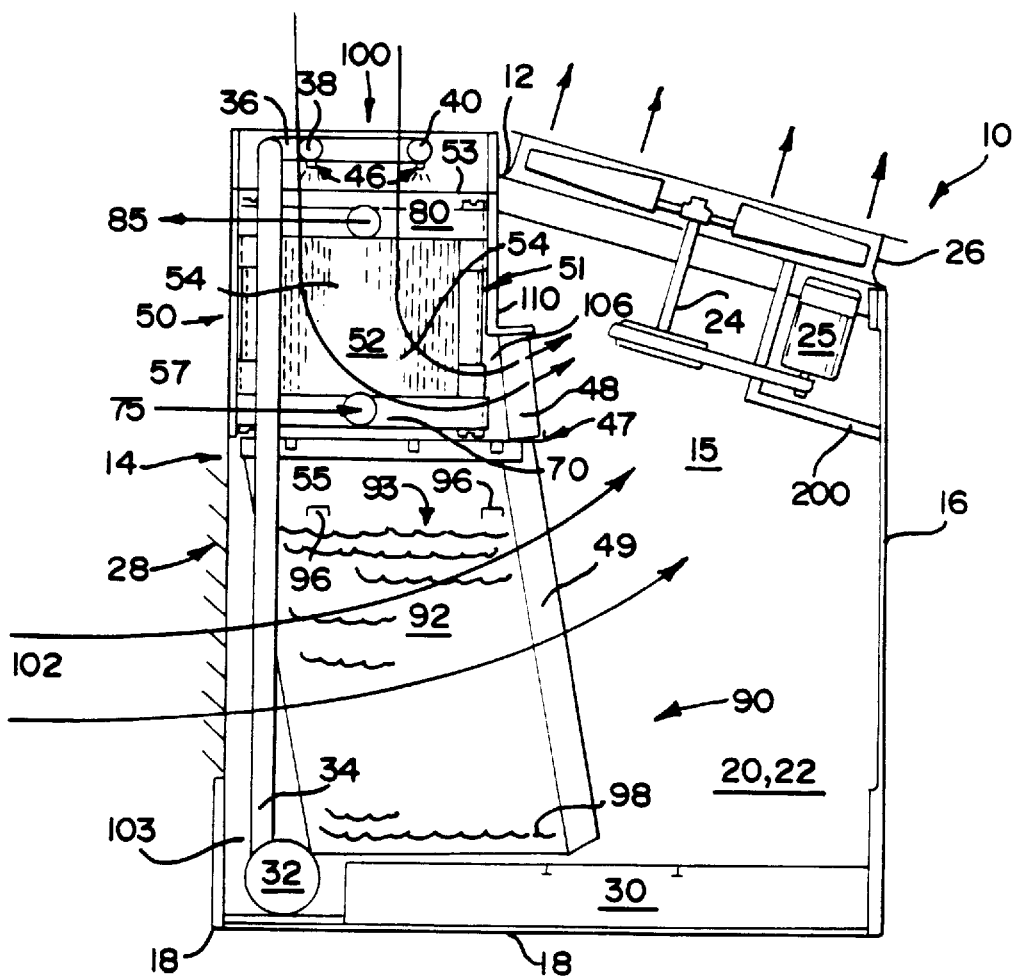
FIG. 6 is another embodiment of the present invention without the plenum space between the direct and indirect sections, and the air stream exiting the indirect section through the side.

However, contrary to the excellent heat exchange capabilities of the FIG. 1 apparatus 10, which were just explained and illustrated in FIG. 1, the plenum space 105 shown in that embodiment is effectively "dead space" from an economic point of view because it adds substantial costs when building a taller tower, although operationally, the plenum was determined to operationally improve overall heat exchange within the indirect section, thereby helping to obtain greater uniformity of circuit to circuit performance. However, the economic realities in the everyday world are the more dominating factor in the sale of such apparatus, and alternatives to the apparatus which uses a plenum space have introduced two alternative embodiments, as seen in FIGS. 4 and 6. Although the efficiencies and uniformities of these embodiments are not maximized to the extent of the FIG. 1 embodiment, the price for not attaining that extra incremental amount of efficiency is economically offset to the customer through lower initial construction costs.

In more detail, both the embodiments of FIGS. 4 and 6 directly address the economic issue by removing the plenum space so that indirect section 50 is superposed directly upon direct heat exchange section 90. However, as will become evident, dropping the indirect section and removing the plenum limits the operability of the indirect section 50 to either a crosscurrent or concurrent air flow scheme and it further creates an operating concern with respect to getting the entering air out of apparatus 10 when using the concurrent air flow scheme.

Turning first to FIG. 6, it is seen that all of the air flow entering primary air inlet 100 still enters indirect section 50 in a substantially concurrent direction to the downwardly sprayed cooling water, but now apparatus 10 is provided with an opening 106 in partition wall 110 on the inboard side of indirect heat exchange section 50 to let part of the air out. In this way, after the air stream has substantially passed through the vertical extent of coil assembly 52 and approaches bottom side 55 of indirect section 50, part of it subtly changes direction by approximately 90 degrees and is converted into a crosscurrent flow stream at that point. Fan 24 then pulls both portions of the air stream through opening 106 and upper drift eliminator 48 so that entrapped moisture is removed from the air before it is passes into passageway 15 for discharge through fan cylinder 26. Because most of the heat exchange taking place within indirect section 50 is through indirect sensible heat exchange between the uniform temperature cooling water and the internally flowing fluid, this particular air flow scheme has been found to have reduced the cost to capacity ratio of the apparatus 10.

Now turning to FIG. 4, it is seen that the primary inlet has been changed to the outboard side 57 of indirect heat exchange section 50 so that the air entering air inlet 100 travels through the longitudinal depth of indirect section 50 in a crosscurrent fashion with respect to the downwardly sprayed cooling water. From FIG. 4, it is clear that the air stream initially entering air inlet 100 no longer contacts the entire series of circuits containing the coldest fluid which has been cooled during upward travel through coil assembly 52. As this approach was explained earlier and by the FIG. 10 graphical comparison to the preferred embodiment, it will not be discussed at great lengths except to say that this embodiment is not as efficient as the alternative embodiment of FIG. 6, although it does address the above-mentioned economic concerns in a rather effective manner.

While the invention has been described in connection with the preferred embodiment used as a fluid cooling device, one skilled in the art should appreciate that the spirit of the invention is not so necessarily limited to the rectangular single coil assembly tower structure shown in FIG. 1. For the sake of discussion, it is important to understand that the orientation of each circuit 54,56 comprising coil assembly 52 certainly contributes to the total amount of cooling capacity, but it is the uniform temperature cooling water which is the most important feature of this invention and any type of structure and circuit arrangement can be used to carry out the invention as long as this operating feature is maintained.

This point is best observed from viewing either of the structurally different embodiments presented in FIGS. 2 or 3. Specifically, FIG. 2 illustrates substantially the same embodiment as the one shown in FIGS. 1 or 6, except that the cooling apparatus 10 now has the direct and indirect heat exchange sections 50 and 90 split into a side-by-side arrangement. The operation of apparatus 10 in FIG. 2 is substantially the same as the preferred FIG. 1 embodiment, except that since the two heat exchange sections 50 and 90 are no longer stacked, the cooling water exiting indirect section 50 must be collected in sump 30A and then pumped to the top of direct heat exchange section 90 through the use of auxiliary pump 32A. Adding pump 32A makes the FIG. 2 embodiment slightly less energy efficient on the whole, but depending upon height restrictions or the initial tower costs for building a taller tower, the additional energy use might be justified while still maintaining the spirit of the invention. It should be realized that this embodiment still utilizes a uniform temperature cooling water in the indirect section 50 as well as the parallel flowing air and water flow streams, although this embodiment could easily utilize crosscurrent air flow too, even though that air flow pattern is not as efficient in removing the heat from the water.

In FIG. 3, all of the inventive features found in the preferred embodiment of the present invention have also been maintained in this embodiment even though apparatus 10 has been constructed into a round enclosure. As seen, the indirect coil assembly 52 is above the direct section fill bundle 90 in order to eliminate water temperature differentials. It is also clear that the air and water flow streams will still contact all of the circuits along top side 53 of indirect section 50, making this embodiment function essentially no different from the FIG. 1 embodiment. As a matter of fact, the preferred embodiment lends itself to other minor changes which can help improve some of the heat exchange capabilities of the apparatus even further, although some energy efficiency trade-offs must be made. For example, as with any heat exchange device, it is well known to pipe such devices in series to gain even greater heat exchange capabilities and attention may now be directed to FIGS. 11–14 to explain those possible capabilities.

Figure 11:
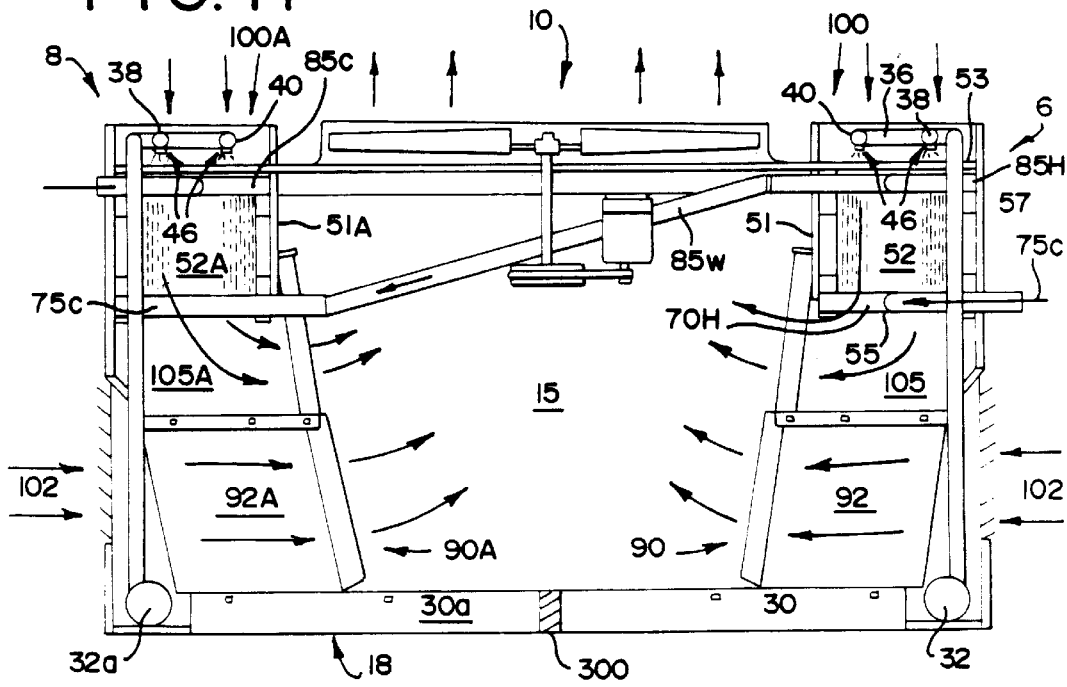
FIG. 11 is a side view of the preferred embodiment of the present invention when used as a dual coiled closed loop cooling tower, the coil assemblies being piped in series.

Referring now to FIG. 11 of the drawings, a series flow, dual coiled assembly 52 and 52A is incorporated into apparatus 10 with a split cooling water system. This apparatus is generally known in the art as a closed loop, double coiled cooling tower and represents the preferred dual coiled embodiment. Each of the tower ends 6 and 8 contain the exact same elements within each respective tower half as are contained within the structure of the single coiled, preferred embodiment of FIG. 1. As seen, the hot fluid to be cooled is initially supplied to the first tower end 6 through supply piping 75W. The hot fluid generally enters and travels upwardly as previously explained for the single coiled apparatus, however, instead of exiting indirect heat exchange section 50 and returning to the offsite process, the fluid leaves indirect section 50 through piping 85W and is communicated to the inlet header 75c on the second indirect coil assembly 52A of the second indirect heat exchange section 50A of tower half 8. Once again, the fluid travels upwardly through heat exchange section 52A and cooling capacity is further increased by an additional 10% as compared to the same unit with the heat exchange sections piped in parallel. Once cooled within indirect heat exchange section 52a, the fluid is then returned to the offsite process through discharge piping 85C. All methods of heat exchange within each of the heat exchange sections on each tower half 6 and 8 are exactly the same as those previously described with the single coil operation, except that the cooling water systems for each tower half 6,8 operate separately, with each tower half 6,8 having its own sump, 30 and 30A, and its own cooling water distribution system.

Figure 13:
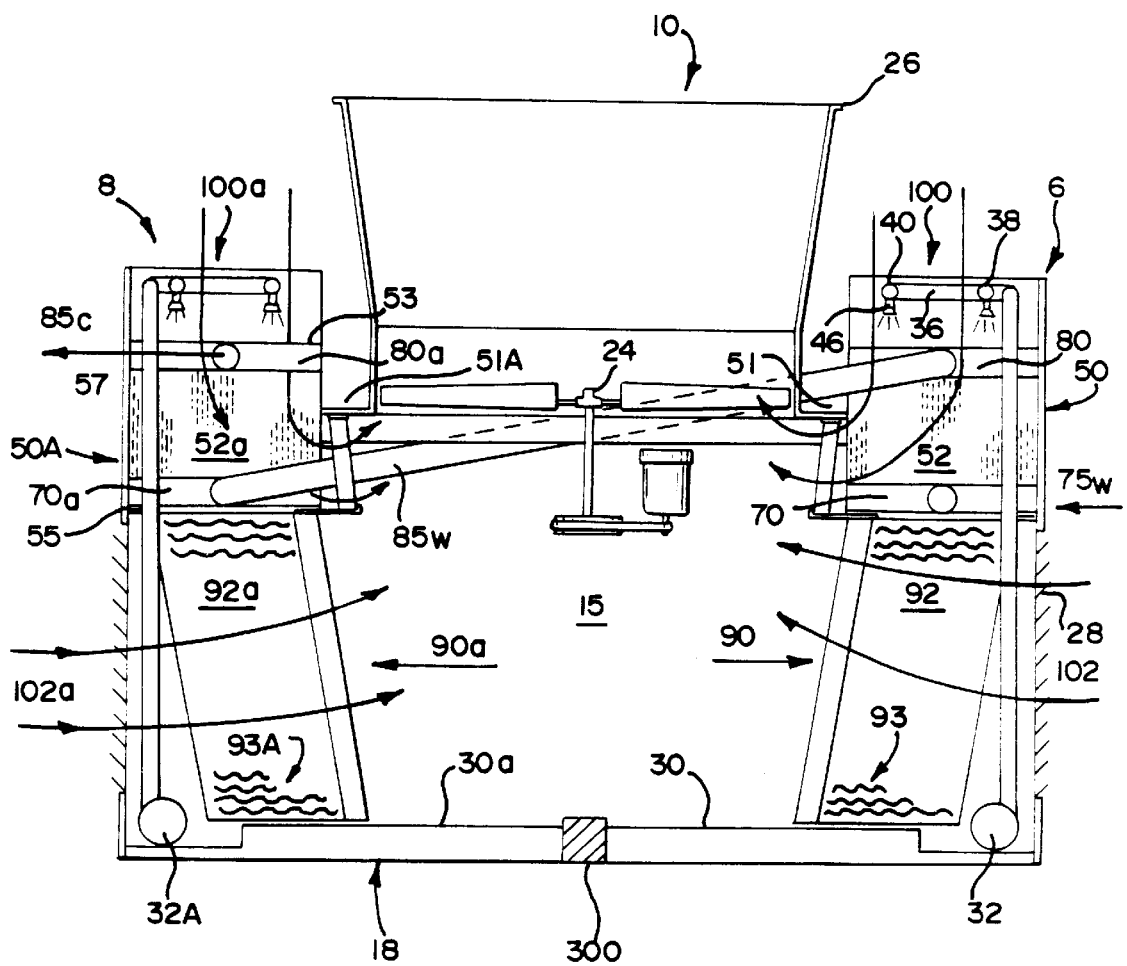
FIG. 13 is a side view of the embodiment shown in FIG. 11 without the plenum space between the direct and indirect sections.

A counterpart to the single coil embodiment described in FIG. 6 is similarly seen in FIG. 13, where the plenum space 105 has been removed and replaced with fill media. Again, this dual coiled embodiment performs its heat exchanging functions as just described for the FIG. 11 embodiment, except that by removing the plenum, a portion the air cannot travel completely through the indirect heat exchange section, and a portion must exit the inboard sides 51,51A of indirect section 50,50A. The cooling water system of the FIG. 13 embodiment is the same as the FIG. 11 embodiment, and therefore will not be described further.

Figure 14:
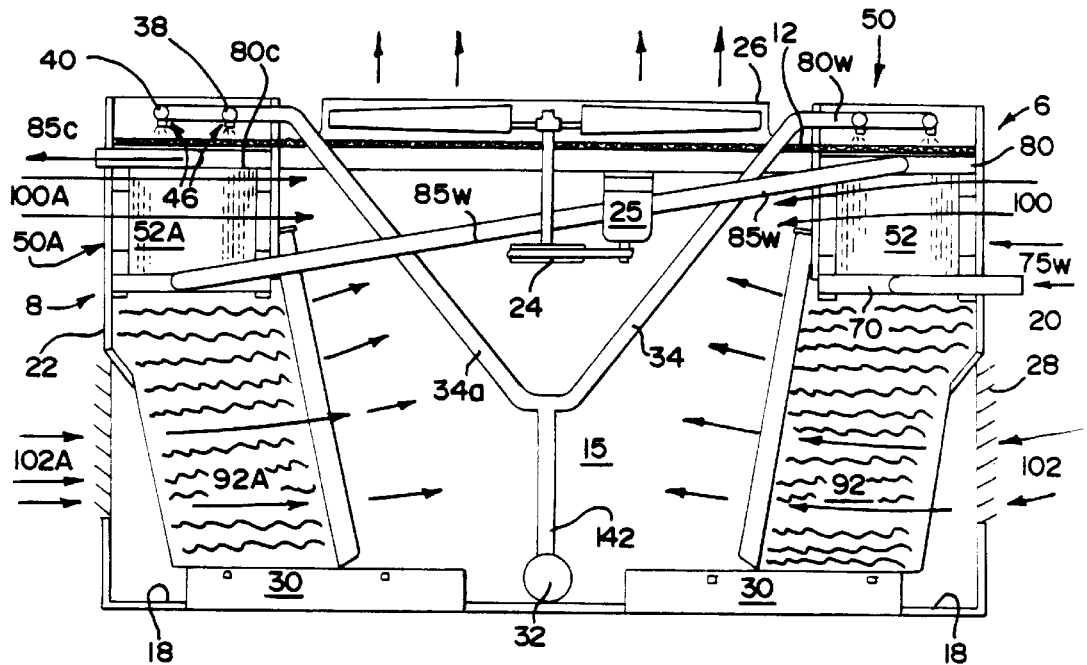
FIG. 14 is a side view of the embodiment shown in FIG. 13 utilizing the crosscurrent air flow arrangement in the indirect heat exchange section.

Likewise, the embodiment shown in FIG. 14 represents the dual flow counterpart to the single flow embodiment shown in FIG. 4 where each heat exchange sections 50 and 90 utilize a crosscurrent air flow pattern. It is also illustrated as having a cooling water system with a common sump so that versatility in piping and arrangements are available, although this embodiment would not provide as cold a temperature of cooling water to the second indirect heat exchange section 52a, as the cooling system piped like the FIG. 11 embodiment.

Figure 12:
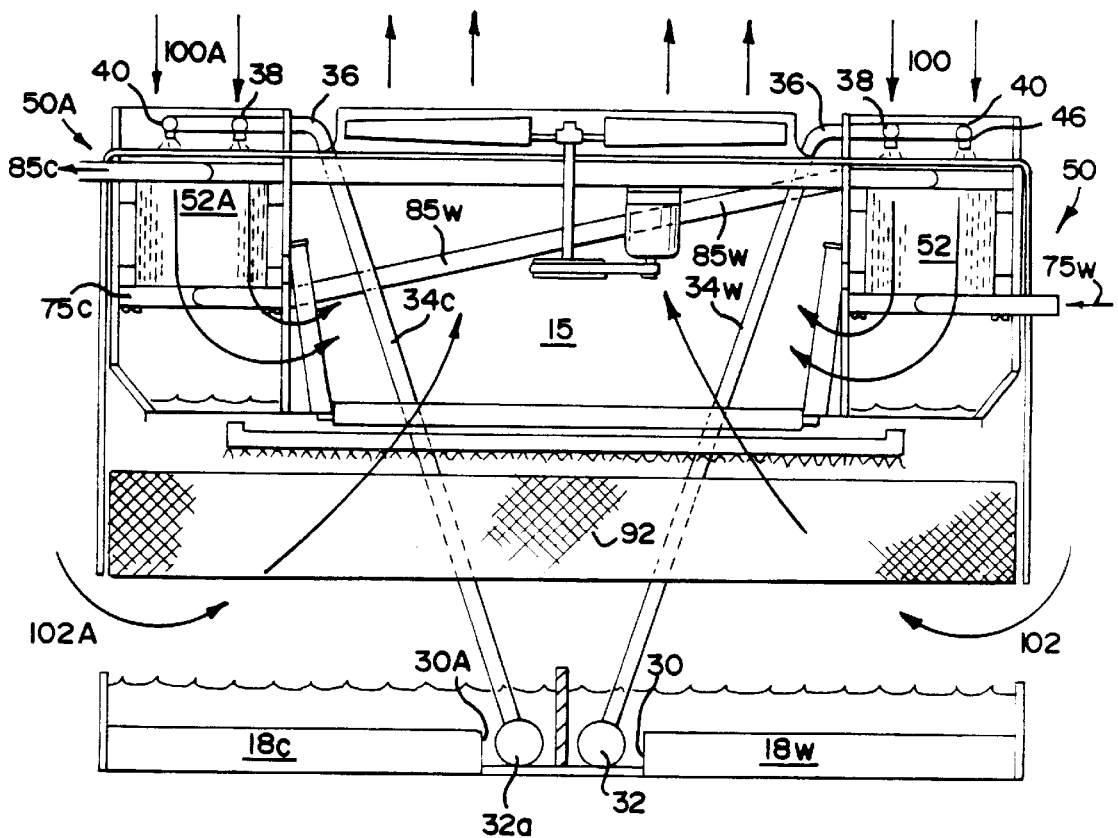
FIG. 12 is a side view of the invention shown in FIG. 11 with the direct evaporative heat exchange section using a counterflow air design and an intermediate distribution system for supplying evaporative liquid to the direct evaporative heat exchange section.

Referring now to FIG. 12, a slightly different dual-coiled embodiment is shown, where the direct evaporative heat exchange section 90 is now utilizing a countercurrent air flow direction instead of the typical crosscurrent direction. Once again, the operation of this embodiment is similar to the other embodiments already described, except that if space and costs are of less concern, this particular direct heat exchange section will experience a slightly larger amount of cooling efficiency due to the countercurrent air flow arrangement.

While the invention has been described in connection with the preferred embodiment and several alternative embodiments being used as a fluid cooling device, one skilled in the art should also appreciate that the invention is not so necessarily limited, and that this invention could also be used as an evaporative condenser in any one the embodiments already shown and described.

Since each component of apparatus 10 when used as an evaporative condenser is exactly the same as when used as a fluid cooler, the same reference characters and nomenclature will be used in describing the present invention as a gas condenser and the discussion will be limited to such operation only in the single coil assembly shown in FIG. 1.

When the preferred embodiment of FIG. 1 is used as an evaporative condenser, it performs substantially the same way as when apparatus 10 is used as a fluid cooler, except that instead of a cooled fluid leaving top header 80 through pipe 85, pipe 85 is used for supplying a superheated vapor, such as a hot refrigerant gas, to the indirect heat exchange section 50 for cooling, thereby condensing the hot refrigerant gas back to a liquid state. The gas enters header 80, where an internally mounted baffle plate 99 ensures uniform distribution to all of the individual conduits 54,56 connected to header 80. If baffle plate 99 were not used, the gas stream would concentrate around the entrance of pipe line 85, thereby decreasing the performance of indirect condensing section 50 through uneven circuit to circuit performance. As before, the coldest available air entering primary air inlet 100 and the coldest uniform temperature water sprayed downwardly from spray distribution nozzles 46, contacts the hottest available gas stream entering conduits 54,56, thereby providing the most efficient and effective use of each cooling medium for condensing the gas. As explained earlier with the fluid cooler operations, the evaporative water that is descending and being heated through vapor condensing section 50, is partially cooled in the indirect section through evaporative heat exchange with the entering air, and is further cooled by direct evaporative heat exchange with the air flowing within the direct evaporative heat exchange section 90. The cooled evaporative liquid is then gathered in sump 30 for redistribution by pump 32 to distribution means 36 for recirculation in the indirect heat exchange section 50.

The heated air streams traveling through each of the heat exchange sections enter passageway 15, and then are discharged by fan 24 to the atmosphere. It is very important to provide uniform circuit to circuit performance when operating apparatus 10 as an evaporative condenser and the uniformity of performance is ensured by maintaining an even flow distribution and retention time of the gas within each circuit, as well as maintaining a uniform temperature for the cooling water, and to a lesser extent, a uniform temperature air stream. Uniformity is more critical in an evaporative condenser or else the coil assembly 52 will experience uneven condensing performance. For example, if the circuits closest to the outboard side 57 of the indirect heat exchange section are exposed to a colder evaporative liquid than the circuits on the inboard side 51, then the outboard circuits are capable of condensing greater amounts of vapor. The increased capacity in the outboard circuits causes an increase in pressure drop through these circuits. Since the inlets and outlets of each circuit are connected to common headers, the overall pressure drop across all circuits must be identical. Therefore, liquid must back up into the outboard circuits in order to create a balancing liquid head to compensate for the extra frictional pressure drop in these circuits. When liquid backs up, it causes a decrease in performance due to the reduction of coil surface available for condensing. Therefore, this form of operation which is common with prior art condensers, is undesirable because it causes less than 100 percent utilization of the available condensing surface and decreases the rated output of the apparatus. After the desuperheated gas is condensed into a liquid, it is collected in lower header 70 and then discharged via piping 75 for use in the offsite process again. All of the dual coiled embodiments shown in FIGS. 11–14 can also be used as gas condensers too, performing in substantially the same way as just described. However, in a dual-coiled condenser, the hot gas entering the first indirect heat exchange section exits as a combination gas and fluid and is then fully condensed to a fluid in the second indirect heat exchange section.

One skilled in the art should appreciate even further that the invention is not so necessarily limited to only fluid cooler or evaporative condenser devices and that this invention could even be used as a wet air cooler in any one the embodiments already shown and described.

Again, since each component of apparatus 10, when used as a wet air cooler, is exactly the same as when used as a fluid cooler or an evaporative condenser, the nomenclature and reference characters used in describing the previous devices will be exactly the same for a wet air cooler. Turning attention to FIG. 6, the operation of this embodiment when used as a wet air cooler will now be described operationally, the air flow streams entering the primary and secondary air inlets, 100 and 102 respectively, will be same as previously described; concurrent in the indirect section and crosscurrent in the direct section. However, the object of apparatus 10 now, is to cool the warm air streams entering the direct and indirect heat exchange sections. Instead of containing a hot fluid to be cooled, each of the series of circuits 54, 56 of coil assembly 52 now contain an initially chilled fluid which is supplied from an off-site process. In lieu of a chilled fluid the circuits could also contain an evaporating multi phase refrigerant. The chilled fluid enters from the bottom side 55 of indirect section 50 as before, entering supply header 70 and flowing upwardly as a continuous plane of generally uniformly increasing temperature fluid. As the evaporative liquid flows down over the coil assembly 52 heat is simultaneously added from the concurrently flowing initially warm air stream and removed to the counter flowing chilled fluid steam within the circuits 56,54. More heat is removed than added to the evaporative liquid therefore its temperature is decreased as it flows downwardly though the indirect heat exchange section. The warm air stream entering primary air inlet 100 directly contacts and is cooled by the evaporative liquid. Likewise, the chilled fluid within circuits 54,56 absorbs heat from the evaporative liquid, causing the fluid to become heated as it reaches the top side 53 of indirect section 50. The heated fluid enters top header 80 before returning to the off-site process through return piping 85, while the primary air stream exits the indirect section 50 through side opening 106. The now cooled evaporative liquid is then distributed across the direct heat exchange section 92 where it directly contacts and exchanges heat with an initially warm cross flowing secondary air stream passing there through. The temperature of the evaporative liquid increases as it passes downwardly through the direct section and is collected in a sump and then pumped back for redistribution over the indirect heat exchange section. This now cooled secondary air stream mixes with the cooled primary air stream in plenum 15, where the combined air stream is discharged through fan cylinder 26 for use at a separate off-site location, such as for a mining vegetable cooling or gas turbine air inlet precooling operation.

The foregoing description has been provided to clearly define and completely describe the present invention. Various modifications may be made without departing from the scope and spirit of the invention which is defined in the following claims.

What is claimed is:

1. In a heat exchange apparatus, a method of exchanging heat comprising the steps of:
   providing a direct evaporative heat exchange section and an indirect evaporative heat exchange section conducting a fluid stream within a circuit, each of said heat exchange sections respectively having a top side, a bottom side, an inboard side, an outboard side, an air inlet and an air outlet, said top side of said indirect section being above said bottom side of said direct section;
   providing a means above said indirect section top side for spraying a generally uniform temperature evaporative liquid generally downwardly across said indirect evaporative heat exchange section circuit containing said fluid stream;
   providing a means for moving a stream of air between said air inlet and said air outlet in each of said direct and indirect heat exchange sections, each said air stream at each said air inlet having an ambient air temperature, each respective air stream exchanging heat with said evaporative liquid flowing within each respective heat exchange section, said indirect heat exchange section air inlet being associated with said outboard side of said indirect heat exchange section, said indirect heat exchange section air stream flowing substantially crosscurrent to said evaporative liquid;
   distributing substantially all of said evaporative liquid leaving said indirect section across said direct heat exchange section;
   collecting substantially all of said evaporative liquid exiting said direct heat exchange section in a sump; and
   providing a means for pumping substantially all of said collected evaporative liquid upwardly for redistribution to said indirect heat exchange section while substantially maintaining the uniformity of the temperature of the evaporative liquid;
   wherein there is no flow path from the circuit of the indirect heat exchange section that would allow direct contact between the fluid of said indirect heat exchange section fluid stream and the air stream within the direct heat exchange section.

2. The method of claim 1 wherein said direct heat exchange section air inlet is associated with said outboard side of said direct heat exchange section, said direct heat exchange section air stream flowing substantially crosscurrent to said evaporative liquid.

3. The method of claim 1 further comprising the step of placing the indirect heat exchange section above the direct heat exchange section.

4. The method of claim 1 wherein said air moving means, said sump, said pump means, said spray means and each of said heat exchange sections are enclosed within a single structure.

5. The method of claim 1 wherein said indirect heat exchange section includes a plurality of individual circuits for conveying said fluid stream.

6. An apparatus for exchanging heat comprising:
   a direct evaporative heat exchange section and an indirect evaporative heat exchange section, each of said heat exchange sections having a top side, a bottom side, an inboard side, an outboard side, an air inlet and an air outlet, said indirect evaporative heat exchange section including a circuit for conveying a fluid stream, said direct evaporative heat exchange section including a fill media for receiving substantially all of said evaporative liquid exiting said indirect heat exchange section, said evaporative liquid distributed across said fill media, the top side of said indirect evaporative heat exchange section being above the bottom side of the direct evaporative heat exchange section;
   means to move a stream of air between said air inlet and said air outlet in each of said direct and indirect heat exchange sections, each said air stream at each said inlet having an ambient air temperature, said indirect heat exchange section air stream flowing substantially crosscurrent to said evaporative liquid;
   means for downwardly spraying said evaporative liquid at a generally uniform temperature through said indirect section and over said circuit;
   a sump for collecting substantially all of said evaporative liquid after said evaporative liquid is distributed downwardly, said collected evaporative liquid having a uniform temperature;
   at least one pump for pumping substantially all said collected evaporative liquid upwardly for redistribution to said indirect section while substantially maintaining the uniformity of the temperature of the evaporative liquid;
   wherein the apparatus is free from any structure that would provide a flow path from the circuit of the indirect heat exchange section that would allow direct contact between the fluid of said indirect heat exchange section fluid stream and said fill media in said direct heat exchange section.

7. The apparatus of claim 6 wherein said direct heat exchange section air inlet is associated with said outboard side of said direct heat exchange section, said direct heat exchange section air stream flowing substantially crosscurrent to said evaporative liquid.

8. The apparatus of claim 6 wherein said indirect heat exchange section includes a plurality of individual circuits for conveying said fluid stream.

9. The apparatus of claim 6 wherein said indirect heat exchange section air inlet is associated with said outboard side of said indirect heat exchange section and said indirect heat exchange section air outlet is associated with said inboard side of said indirect heat exchange section.

10. The apparatus of claim 6 wherein said indirect heat exchange section further includes a top side fluid header and a bottom side fluid header, each of said top and bottom fluid headers operationally associated with said respective top and bottom sides of said indirect heat exchange section, each of said fluid headers having a fluid header pipe attached to a corresponding side of each respective fluid header for communicating said fluid stream into and out of said top and bottom fluid headers.

11. The apparatus of claim 10 wherein said indirect heat exchange section includes a plurality of individual circuits arranged in a series, each of said circuits within said series including a inlet end and an outlet end, one of said inlet and outlet ends connected to one of said top side and said bottom side fluid headers and the other of said inlet and outlet ends connected to the other of said top side and bottom side fluid headers, each of said individual circuits communicating said fluid stream between said fluid headers.

12. The apparatus of claim 11 wherein each of said individual circuits within said indirect heat exchange section is comprised of a conduit of continuous serpentine shape, said serpentine shape defining an array of vertical successively spaced and generally U-shaped rows, each of said rows generally equal in length and each of said U-shaped rows having a vertical gap therebetween, said gap being substantially equal between said U-shaped rows.

13. The apparatus of claim 12 wherein said series of circuits is comprised of a starting circuit and an adjacent circuit arranged in a continuous side-by-side fashion, each of said adjacent circuits displaced downwardly an equal extent from said starting circuits, said vertical displacement being about one half said vertical gap between said U-shaped rows.

14. The apparatus of claim 6 wherein said downwardly distributed uniform temperature evaporative liquid is in continuous evaporative heat exchange with said air stream flowing within said indirect heat exchange section as said air and said fluid stream flow through said indirect heat exchange section.

15. The apparatus of claim 6 wherein said indirect heat exchange section is disposed above said direct heat exchange section.

16. The apparatus of claim 6 wherein said indirect heat exchange section includes a plurality of individual circuits and wherein said evaporative liquid has an initial and uniform temperature when distributed across each of said individual circuits at said top side of said indirect heat exchange section and a final temperature at said bottom side of said section.

17. The apparatus of claim 16 wherein said indirect heat exchange section air inlet is associated with said outboard side of said indirect heat exchange section and said indirect heat exchange section air outlet is associated with said inboard side of said indirect heat exchange section and wherein said final temperature of said evaporative liquid is non-uniform after said liquid has traveled downwardly along each of said individual circuits of said indirect heat exchange section, thereby forming a temperature gradient in said liquid exiting said indirect heat exchange section, said temperature gradient uniformly increasing from said outboard side to said inboard side.

18. The apparatus of claim 17 wherein said evaporative liquid exiting said indirect heat exchange section is distributed across said direct section top side and said fill media therein, said evaporative liquid having a first direct section temperature gradient, said first direct section temperature gradient being substantially equivalent to said evaporative liquid temperature gradient within said indirect heat exchange section, said evaporative liquid exiting said direct section at said bottom side and having a second temperature gradient.

19. The apparatus of claim 6 wherein said evaporative liquid exiting said indirect section is distributed across said direct section top side and said fill media therein, said evaporative liquid having a first direct section evaporative liquid temperature gradient, said evaporative liquid exiting said direct section at said bottom side and having a second direct section evaporative liquid temperature gradient, said stream of air flowing through said direct section crosscurrent to said evaporative liquid, said crosscurrent air stream evaporatively exchanging heat with said evaporative liquid in a non-uniform fashion such that an air temperature gradient is formed, said air temperature gradient uniformly increasing from said air inlet to said air outlet, said air temperature gradient causing said second direct section evaporative liquid temperature gradient to be relatively higher than said first direct section evaporative liquid temperature gradient.

20. The apparatus of claim 11 wherein said fluid stream is comprised of a single phase fluid, said fluid stream entering each of said individual circuits through said bottom side fluid header as a hot fluid and flowing upwardly at a generally uniform flow rate and decreasing in temperature before exiting from said circuits into said top side fluid header as cooled fluid.

21. The apparatus of claim 11 wherein said fluid stream is comprised of a single phase fluid, said fluid stream entering each of said individual circuits through said bottom side fluid header as a chilled fluid and flowing upwardly at a generally uniform rate and generally increasing temperature before exiting from said individual circuits into said top side fluid header as a warm fluid.

22. An apparatus for exchanging heat comprising:
a direct evaporative heat exchange section and an indirect evaporative heat section, each of said heat exchange sections having a top side, a bottom side, an inboard side and an outboard side, an air inlet and an air outlet, said indirect heat exchange section having a circuit for conveying a fluid stream through said indirect heat exchange section;
means for moving air between said air inlet and said air outlet in each of said direct and indirect heat exchange sections, the air inlets and air outlets being positioned to provide independent air flow paths for air to move through the direct and indirect heat exchange sections non-serially;
an evaporative liquid;
means for spraying said evaporative liquid downwardly to said indirect heat exchange section for indirect heat exchange with the fluid stream in said circuit;
the top side of the direct heat exchange section receiving evaporative liquid from the bottom side of the indirect heat exchange section;
a sump for collecting substantially all of said evaporative liquid from said direct heat exchange section, said collected evaporative liquid having a substantially uniform temperature; and
means for moving said evaporative liquid from said sump to said means for spraying while substantially maintaining the uniformity of the temperature of said evaporative liquid;

the means for spraying and the indirect heat exchange section being positioned to maintain substantially the uniformity of the temperature of the evaporative liquid entering the top side of the indirect heat exchange section;

the apparatus being free from any fill material between the means for spraying and the top side of the indirect heat exchange section so that the uniformity of the temperature of the evaporative liquid is substantially maintained;

the air flow path from the indirect heat exchange section air inlet to the air outlet being in a direction different from the direction of travel of the evaporative liquid through the indirect heat exchange section;

the apparatus being free from any structure that would provide a flow path from the circuit of the indirect heat exchange section that would allow direct contact between the fluid of the indirect heat exchange section fluid stream and the evaporative liquid.

23. The apparatus of claim 22 wherein the air flow path between the indirect heat exchange section air inlet and air outlet is between the outboard and inboard side of the indirect heat exchange section.

24. The apparatus of claim 22 wherein the air flow path through the direct heat exchange section air inlet to air outlet is in a direction different from the direction of travel of the evaporative liquid through the direct heat exchange section.

25. The apparatus of claim 23 wherein the air flow path between the direct heat exchange section air inlet and air outlet is in a direction different from the direction of travel of the evaporative liquid through the direct heat exchange section.

26. The apparatus of claim 24 wherein said direct heat exchange section air inlet is associated with said outboard side of said direct heat exchange section, said direct heat exchange section air stream flowing substantially crosscurrent to said evaporative liquid through said direct heat exchange section.

* * * * *